United States Patent
Ge et al.

(10) Patent No.: US 11,597,507 B2
(45) Date of Patent: Mar. 7, 2023

(54) COAXIAL HELICOPTER AND CONTROL METHOD THEREOF

(71) Applicant: Suzhou Taoxun Aviation Technology Co., Ltd., Jiangsu (CN)

(72) Inventors: Xun Ge, Jiangsu (CN); Yuan Shen, Jiangsu (CN); Shuzhen Guo, Jiangsu (CN); Liangwei Li, Jiangsu (CN); Weidong Liu, Jiangsu (CN)

(73) Assignee: Suzhou Taoxun Aviation Technology Co., Ltd., Jiangsu (CN)

( * ) Notice: Subject to any disclaimer, the term of this patent is extended or adjusted under 35 U.S.C. 154(b) by 143 days.

(21) Appl. No.: 17/335,085

(22) Filed: Jun. 1, 2021

(65) Prior Publication Data

US 2021/0323661 A1    Oct. 21, 2021

Related U.S. Application Data

(63) Continuation of application No. PCT/CN2020/126690, filed on Nov. 5, 2020.

(30) Foreign Application Priority Data

Dec. 24, 2019  (CN) .................. 201911350590.X (51) Int. Cl.
*B64C 27/80* (2006.01)
*B64C 27/10* (2006.01)
(Continued)

(52) U.S. Cl.
CPC .............. *B64C 27/80* (2013.01); *B64C 27/10* (2013.01); *B64C 27/605* (2013.01); *B64C 27/64* (2013.01); *B64C 27/68* (2013.01)

(58) Field of Classification Search
CPC ....... B64C 27/80; B64C 27/10; B64C 27/605; B64C 27/64; B64C 27/68
See application file for complete search history.

(56) References Cited

U.S. PATENT DOCUMENTS

| | | | |
|---|---|---|---|
| 9,199,729 B1 | 12/2015 | Uebori et al. | |
| 2014/0091172 A1* | 4/2014 | Arlton | B64C 27/10 244/17.23 |
| 2015/0321754 A1* | 11/2015 | Uebori | G05D 1/0011 244/17.23 |

FOREIGN PATENT DOCUMENTS

| | | |
|---|---|---|
| CN | 104691752 | 6/2015 |
| CN | 104691752 A * | 6/2015 |

(Continued)

OTHER PUBLICATIONS

Machine Translation of CN-109969388-A, Chen M, Jul. 2019 (Year: 2019).*

(Continued)

*Primary Examiner* — Tien Q Dinh
*Assistant Examiner* — Katherine June Bolek
(74) *Attorney, Agent, or Firm* — JCIP Global Inc.

(57) ABSTRACT

The application discloses a coaxial helicopter, the cyclic pitch-changing mechanism simultaneously adjusts the pitches of the upper and the lower rotor systems, to make uniformity cyclic pitch-changing adjustment of the upper and lower rotors, and make independent collective pitch adjustment of the upper rotor system; the differential pitch-changing mechanism and the cyclic pitch-changing mechanism jointly act on the lower rotor system, to perform differential collective pitch adjustment of the upper and lower rotor systems. The synchronous rotating mechanism drives the swashplate members to synchronously rotate along with the drive shaft. The application achieves a simpler hybrid pitch-changing control system of the coaxial rotor pitch, a plurality of flight operations of the coaxial aircraft are performed synchronously, and a plurality of flight control modes, such as semi-differential and full-differential in a variable speed or a fixed speed mode, are (Continued)

supported, and thus the present application has wider application space.

16 Claims, 9 Drawing Sheets

(51) Int. Cl.
    *B64C 27/605*     (2006.01)
    *B64C 27/64*     (2006.01)
    *B64C 27/68*     (2006.01)

(56) References Cited

FOREIGN PATENT DOCUMENTS

| | | |
|---|---|---|
| CN | 106428542 | 2/2017 |
| CN | 206050067 | 3/2017 |
| CN | 108275264 | 7/2018 |
| CN | 109131861 | 1/2019 |
| CN | 109131861 A * | 1/2019 |
| CN | 109969388 | 7/2019 |
| CN | 109969388 A * | 7/2019 |
| CN | 110979651 | 4/2020 |

OTHER PUBLICATIONS

Machine Translation of CN-104691752-A, Ge X, Jun. 2015 (Year: 2015).*
Machine Translation of CN-109131861-A, Chen M, Jan. 2019 (Year: 2019).*
"International Search Report (Form PCT/ISA/210) of PCT/CN2020/126690," dated Feb. 18, 2021, pp. 1-5.
"Written Opinion of the International Searching Authority (Form PCT/ISA/237) of PCT/CN2020/126690," dated Feb. 18, 2021, pp. 1-5.

* cited by examiner

COAXIAL HELICOPTER AND CONTROL METHOD THEREOF

CROSS-REFERENCE TO RELATED APPLICATION

The present application is a continuation of international application of PCT application No. PCT/CN2020/126690 filed on Nov. 5, 2020, which claims the priority benefit of China application No. 201911350590.X filed on Dec. 24, 2019. The entirety of the above-mentioned patent applications is incorporated herein by reference and made a part of this specification.

BACKGROUND

Technical Field

This application relates to the field of helicopters, and more particularly, to a coaxial helicopter and a control method thereof.

Description of Related Art

Compared with a single-rotor helicopter, the coaxial contra-rotating rotor helicopter has the advantages that an arm span of the rotor is short, power consumption is low, a tail rotor does not need to be installed to balance counter moment generated by rotation of the rotor, and the structural design is more flexible. Ka-50 coaxial contra-rotating helicopter designed and manufactured by the Russian Kamov design bureau is a typical representative of such type of helicopter. The coaxial helicopter with a relatively simple structure in the prior art usually has the upper and lower rotors which cannot unify single-blade differential pitch-changing and synchronous pitch-changing, and the helicopter needs to be adjusted by the rotating speed of the rotors besides the pitch when realizing maneuvers such as lifting, rolling, pitching, yawing and reverse flight, and cannot maneuver by directly changing the pitch. Such solutions can lead to slow aircraft motivation and low efficiency due to the influence of rotor system inertia.

Two pitch-changing schemes with four servomechanisms for hybrid control are proposed in patent 201510097444.6 and 201610673069.X, respectively, which can realize the difference of independent pitch-changing of upper and lower rotors and the consistency of cyclic pitch. These two solutions perform maneuvering by changing the pitch, thereby effectively solving the problem of low maneuvering efficiency of the helicopter. Patent 201510097444.6 adopts a scheme of four servomechanisms arranged below, in which three servomechanisms make pitch uniformity adjustment of the upper and lower rotors, and the fourth servomechanism makes independent pitch adjustment of the upper rotor. The operating mechanism arranged around the drive shaft is comparatively complicated in this scheme, except the mechanism for controlling the pitch change of the upper and lower rotors, two sets of operating mechanisms are arranged to drive the upper and lower swashplates to rotate synchronously with the upper and lower rotors respectively. In addition, the upper rotor pitch adjusting servomechanism arranged below is connected to the upper rotor pitch adjusting mechanism through an elongated shaft passing through the inside of the drive shaft. This not only leads to a high manufacturing cost, but also a complex installation, which leads to a great risk of reliability and safety of the whole operating mechanism during actual flight. Patent 201610673069.X adopts a scheme in which three servomechanisms are arranged below and one servomechanism is arranged above, in particular, the lower servomechanism makes uniformity adjustment of the pitches of the upper rotor and the lower rotor, and the upper servomechanism makes independent adjustment of the pitch of the upper rotor. This scheme integrates the steering mechanism for synchronous rotation of the swashplate following the rotor into the pitch-changing mechanism of the upper and lower rotors, cancels the elongated shaft passing through the inside of the rotor drive shaft, simplifies the steering mechanism, and improves the defect of patent 201510097444.6 to some extent. Patent 201810177755.7 proposes a novel pitch-changing scheme, in which the lower rotor pitch is independently controlled by using three lower servomechanisms, and the upper rotor pitch is independently controlled by a single upper servomechanism. The scheme has simple and compact structure and high flight and steering efficiency in miniature and small helicopter applications. However, for medium and large helicopters, a single servomechanism to control the rotor pitch independently is a serious test for the output power.

It can be seen that, the hybrid pitch-changing scheme has a wider application range when compared to the common pitch-changing scheme in the prior art. In the existing hybrid pitch-changing scheme, the scheme of four servomechanisms arranged below has an elongated shaft passing through the inside of the rotor drive shaft, which not only causes structural reliability and safety problems, but also causes an obstacle to wiring of electronic systems such as GPS (global positioning system). The scheme of three servomechanisms arranged below and one servomechanism arranged above needs to additionally arrange an installation structure of the servomechanism arranged above around the rotation shaft of the upper rotor, which results in defects, such as complex structure and affecting the installation of GPS elements.

SUMMARY

In order to overcome the problems described above, it is an objective of the present application to provide a coaxial helicopter and a control method.

To achieve the objectives, in a first aspect, embodiments of the present application provide a coaxial helicopter including a fuselage, an upper rotor actuator, a lower rotor actuator, an upper rotor drive shaft, a lower rotor drive shaft, an upper rotor system, a lower rotor system, and a servomechanism. The coaxial helicopter further includes: a cyclic pitch-changing mechanism and a differential pitch-changing mechanism. The upper rotor actuator and the lower rotor actuator are located below the lower rotor system and are fixedly connected to the fuselage. One end of the lower rotor drive shaft is connected to an output shaft of the lower rotor actuator, and the other end of the lower rotor drive shaft is fixedly connected to the lower rotor system. One end of the upper rotor drive shaft is connected to an output shaft of the upper rotor actuator, and the other end of the upper rotor drive shaft extends through the lower rotor drive shaft to be fixedly connected to the upper rotor system. Four servomechanisms are provided, and each servomechanism is fixedly connected to the fuselage. The cyclic pitch-changing mechanism is provided with an upper swashplate, and the upper swashplate is located between the upper rotor system and the lower rotor system and is slidably mounted outside the upper rotor drive shaft. The differential pitch-changing mechanism is provided with a rotatably-supported shaft sleeve which is slidably mounted outside the lower rotor drive shaft and keeps synchronous rotation with the lower rotor drive shaft. The cyclic pitch-changing mechanism is further provided with a lower swashplate which is located between the lower rotor system and the fuselage, and is slidably mounted outside the rotatably-supported shaft sleeve in the differential pitch-changing mechanism.

Three of the four servomechanisms directly drive the cyclic pitch-changing mechanism through a link, and simultaneously adjust the pitches of the upper rotor system and the lower rotor system, to make uniformity cyclic pitch-changing adjustment of the upper and lower rotors, and independent collective pitch adjustment of the upper rotor. Another of the four servomechanisms drives the differential pitch-changing mechanism through a link and a lever, and acts on the lower rotor system together with the cyclic pitch-changing mechanisms driven by the other three servomechanisms, to perform differential collective pitch adjustment of the lower rotor, and thus make independent collective pitch adjustment of the upper rotor system and the lower rotor system.

Preferably, the differential pitch-changing mechanism includes a fourth servomechanism horn, a fourth servomechanism link, a fixed support bracket, a rotatably-supported bracket, a lower lever support bracket, a non-rotating sliding disc, a rotatably-supported shaft sleeve, an upper lever support bracket, a lower swashplate drag link, and a lower rotor pitch-changing drag link. One end of the fourth servomechanism horn is fixedly connected to an output shaft of a fourth servomechanism of the four servomechanisms, and the other end of the fourth servomechanism horn is hinged to one end of the fourth servomechanism link. The other end of the fourth servomechanism link is hinged to one end of the lower lever support bracket. The fixed support bracket is fixedly connected to the fuselage. One end of the rotatably-supported bracket is hinged to the fixed support bracket, and the other end of the rotatably-supported bracket is hinged to the middle part of the lower lever support bracket. The other end of the lower lever support bracket is hinged to the non-rotating sliding disc. The non-rotating sliding disc is hinged to one end of the rotatably-supported shaft sleeve via a bearing and is sleeved outside the lower rotor drive shaft together with the rotatably-supported shaft sleeve. The other end of the rotatably-supported shaft sleeve is hinged to the upper lever support bracket. The middle part of the upper lever support bracket is hinged to the lower swashplate drag link, and the other end of the upper lever support bracket is hinged to the lower rotor pitch-changing drag link. The lower rotor pitch-changing drag link is hinged to the lower rotor system; when the lower rotor system differentially changes the pitches, the fourth servomechanism horn is driven to rotate by the output shaft of the fourth servomechanism to drive the fourth servomechanism link to move, the fourth servomechanism link pulls the lower lever support bracket to rotate, the lower lever support bracket drives the non-rotating sliding disc to slide up and down along the lower rotor drive shaft, the non-rotating sliding disc drives the rotatably-supported shaft sleeve to slide up and down along the lower rotor drive shaft, and the rotatably-supported shaft sleeve keeps synchronous rotation with the lower rotor drive shaft. The upper lever support bracket drives the lower rotor pitch-changing drag link to move under the combined action of the rotatably-supported shaft sleeve and the lower swashplate drag link, and the lower rotor pitch-changing drag link drives the lower rotor system to perform lower rotor differential pitch-changing operation.

Preferably, the cyclic pitch-changing mechanism includes a servomechanism horn, a servomechanism link, a non-rotating swashplate, a lower swashplate, a lower swashplate drag link, a rotatably-supported shaft sleeve, an upper lever support bracket, a swashplate tie rod, a transitional swashplate, an upper swashplate, and an upper rotor pitch drag link. Three servomechanism horns are provided, and one end of each servomechanism horn is fixedly connected to the output shaft of the first three servomechanisms respectively. Three servomechanism links are further provided, one end of each servomechanism link is hinged to the other end of three servomechanism horns respectively, and the other end of each servomechanism link is hinged to the non-rotating swashplate respectively. The non-rotating swashplate is hinged to the lower swashplate via a bearing. The lower swashplate is hinged to one end of the lower swashplate drag link. The other end of the lower swashplate drag link is hinged to the middle part of the upper lever support bracket. One end of the swashplate tie rod is hinged to the lower swashplate, the other end of the swashplate tie rod is hinged to the transitional swashplate. The transitional swashplate is hinged to the upper swashplate via a bearing. The upper swashplate is hinged to the upper rotor pitch drag link. The upper rotor pitch drag link is hinged to the upper rotor system. When the upper rotor system and the lower rotor system change pitches cyclically, the servomechanism horn is rotated under the action of the output shaft of the servomechanism, so that the servomechanism link is driven to move, the servomechanism link pulls the non-rotating swashplate to tilt or move up and down, the non-rotating swashplate drives the lower swashplate to tilt or move up and down, the lower swashplate drives the lower swashplate drag link to move, the upper lever support bracket drives the lower rotor pitch link to move under the joint action of the lower swashplate drag link and the rotatably-supported shaft sleeve, and the lower rotor pitch link drives the lower rotor system to perform pitch-changing operation; at that moment, the lower swashplate drives the swashplate tie rod to move, the swashplate tie rod drives the transitional swashplate to tilt or move up and down, the transitional swashplate drives the upper swashplate to tilt or move up and down, the upper swashplate drives the upper rotor pitch drag link to move, and the upper rotor pitch drag link drives the upper rotor system to perform pitch-changing operation.

Preferably, the coaxial helicopter further includes an upper synchronous rotating mechanism. The upper synchronous rotating mechanism includes an upper drive shaft sleeve, an upper synchronous tie rod, and an upper synchronous link. The upper drive shaft sleeve is fixedly connected to the upper rotor drive shaft. One end of the upper synchronous tie rod is hinged to the upper drive shaft sleeve, and the other end of the upper synchronous tie rod is hinged to one end of the upper synchronous link. The other end of the upper synchronous link is hinged to the upper swashplate. The upper synchronous rotating mechanism drives the upper swashplate to synchronously rotate along with the upper rotor drive shaft during operation.

Preferably, the coaxial helicopter further includes a lower synchronous rotating mechanism. The lower synchronous rotating mechanism includes a lower drive shaft sleeve, a lower synchronous tie rod, and a lower synchronous link. The lower drive shaft sleeve is fixedly connected to the lower rotor drive shaft. One end of the lower synchronous tie rod is hinged to the lower drive shaft sleeve, and the other end of the lower synchronous tie rod is hinged to one end of the lower synchronous link. The other end of the lower synchronous link is directly hinged to the lower swashplate.

The lower synchronous rotating mechanism drives the lower swashplate to synchronously rotate along with the lower rotor drive shaft during operation.

Preferably, the coaxial helicopter further includes a middle synchronous rotating mechanism. The middle synchronous rotating mechanism includes a middle drive shaft sleeve, a middle synchronous tie rod, and a middle synchronous link. The middle drive shaft sleeve is fixedly connected to the lower rotor system or the lower rotor drive shaft. One end of the middle synchronous tie rod is hinged to the middle drive shaft sleeve, and the other end of the middle synchronous tie rod is hinged to one end of the middle synchronous link. The other end of the middle synchronous link is hinged to the transitional swashplate. The middle synchronous rotating mechanism drives the transitional swashplate to synchronously rotate along with the lower rotor drive shaft during operation.

Preferably, the upper rotor system includes an upper hub, an upper hub sleeve, an upper tie rod connector and an upper rotor; a center of the upper hub is fixedly connected to an upper end of the upper rotor drive shaft. One end of the upper hub sleeve is hinged to an end portion of the upper hub, the other end of the upper hub sleeve is hinged to a root portion of the upper rotor. The upper tie rod connector is fixedly mounted on a side of the upper hub sleeve, and is hinged to the upper rotor pitch drag link.

Preferably, the lower rotor system includes a lower hub, a lower hub sleeve, a lower tie rod connector and a lower rotor; a center of the lower hub is fixedly connected to an upper end of the lower rotor drive shaft. One end of the lower hub sleeve is hinged to an end portion of the lower hub, the other end of the lower hub sleeve is hinged to a root portion of the lower rotor. The lower tie rod connector is fixedly mounted on a side of the lower hub sleeve, and is hinged to the lower rotor pitch drag link.

Preferably, the upper rotor drive shaft is a hollow tubular shaft.

Preferably, at least three swashplate tie rods are provided, and the center of gravity for each the swashplate tie rod is located on the axis of the rotor drive shaft.

Preferably, a hinged connection between respective members is directly hinged or hinged via a bearing.

Preferably, the upper rotor actuator and the lower rotor actuator are selected from any one of a direct-drive or deceleration actuator, an electrically or hydraulically actuated actuator, a dual-power or single-power actuator.

Preferably, the single-layer rotor of the upper system and the lower rotor system is a two-blade rotor or a multi-blade rotor. The rotor is non-folded, laterally folded or longitudinally folded.

Preferably, the servomechanism outputs a torsional force, a pushing force or a pulling force.

Preferably, the coaxial helicopter is equipped with a forward propulsion power system at an appropriate position on the fuselage, to form a high-speed helicopter.

In a second aspect, embodiments of the present application further provide a method of controlling a coaxial helicopter, including the steps of: adjusting, by a cyclic pitch-changing mechanism, a synchronous tilting angle of an upper swashplate and a lower swashplate, controlling a direction of a synchronous cyclic pitch-changing force of an upper system and a lower rotor system, so that pitching and rolling motions of the helicopter are performed; adjusting independently a collective pitch of an upper rotor system, by the cyclic pitch-changing mechanism, and adjusting independently a collective pitch of the lower rotor system in the same direction as the upper rotor system, by the cyclic pitch-changing mechanism and a differential pitch-changing mechanism, so that collective pitches of the upper rotor system and the lower system are increased or decreased synchronously, and lifting motion of the helicopter are performed; and adjusting independently the collective pitch of the upper rotor system, by the cyclic pitch-changing mechanism, and adjusting independently a collective pitch of the lower rotor system in the opposite direction as the upper rotor system, by the cyclic pitch-changing mechanism and the differential pitch-changing mechanism, so that collective pitches of the upper rotor system and the lower system are adjusted differentially, and yawing motion of the helicopter are performed.

Beneficial Effects: The present application adopts hybrid pitch-changing technical solutions with four servomechanisms arranged below. Compared with the prior art, the present application can perform differential adjustment of the pitch of on the lower rotor while performing linkage adjustment on pitches of the upper rotor and the lower rotor, to make uniformity cyclic pitch-changing adjustment of the upper and lower rotors, and make differential adjustment of the pitch on the lower rotor. A plurality of flight operations of the coaxial aircraft are performed synchronously, and a plurality of flight control modes, such as semi-differential and full-differential in a variable speed or a fixed speed mode, are supported, and thus the present application has wider application space. The present application eliminates an elongated shaft structure or an installation structure of an upper servomechanism which is independently adjusted for the upper rotor pitch in the existing hybrid pitch changing solution, and greatly improves the reliability and safety of the system. This scheme integrates the steering mechanism for synchronous rotation of the swashplate following the rotor drive shaft into the pitch-changing mechanism, which can effectively reduce the machining and assembly costs and further improve the reliability of the system. In addition, the rotor drive shaft in this scheme can be designed as a tubular shaft, and the interior thereof can provide a good selection space for electronic device wiring such as GPS arranged on the top of the helicopter.

DESCRIPTION OF THE EMBODIMENTS

Figure 1:
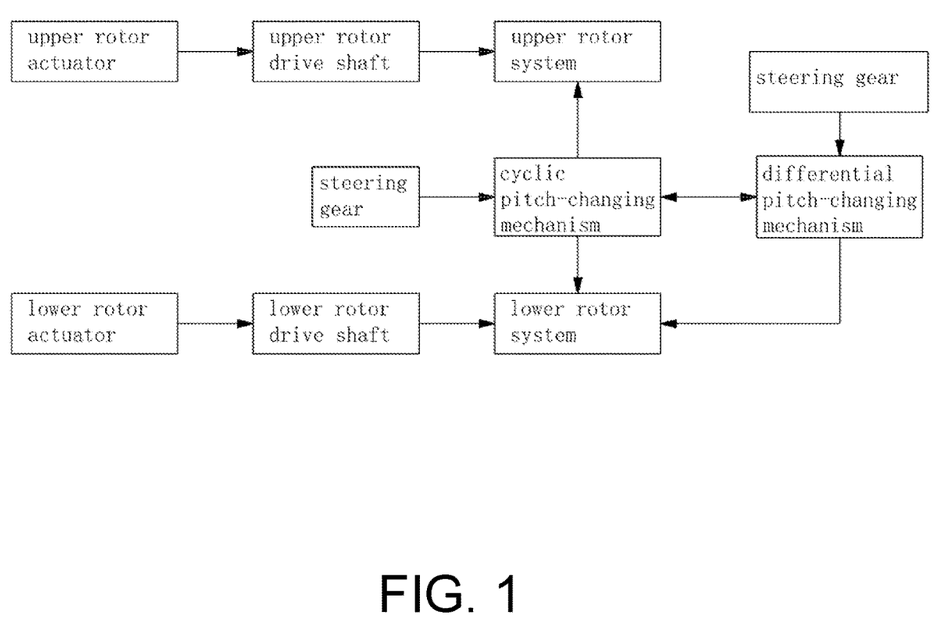
FIG. 1 is a schematic diagram showing the configuration of a coaxial helicopter.

FIG. 1 is a schematic diagram showing the configuration of a coaxial helicopter disclosed in the present application.

The coaxial helicopter disclosed in the present application is mainly characterized in that the pitches of the upper rotor and the lower rotor are controlled in a linkage manner by a cyclic pitch-changing mechanism, and the pitch of the lower rotor is controlled independently by a differential pitch-changing mechanism. In this basic technical solution, for various balancing states and maneuvering states of the coaxial helicopter in flight, corresponding servomechanism rotation angle parameters can meet requirements, and therefore, various required flight states can be obtained.

Hereinafter, the present application is further illustrated with reference to the accompanying drawings and specific embodiments. These embodiments are practiced on the premise of the technical solutions of the present application. It should be understood that, these embodiments are merely explanatory and are not restrictive of the protection scope of the present application.

Embodiment 1

Figure 2:
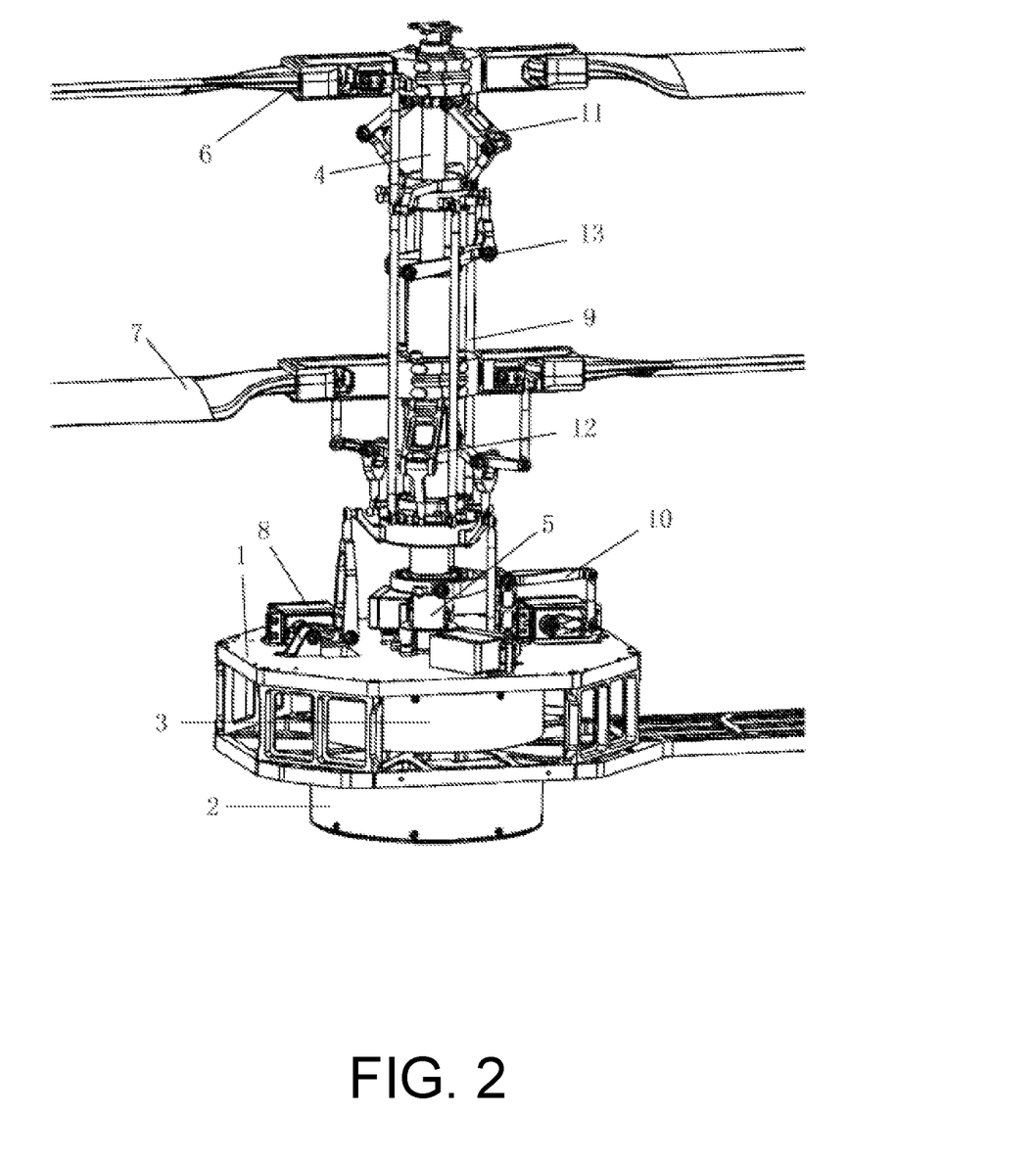
FIG. 2 is a schematic structural diagram of a coaxial helicopter.

As shown in FIG. 2, a coaxial helicopter disclosed in the present embodiment is characterized by including a fuselage 1, an upper rotor actuator 2, a lower rotor actuator 3, an upper rotor drive shaft 4, a lower rotor drive shaft 5, an upper rotor system 6, a lower rotor system 7, a servomechanism 8, a cyclic pitch-changing 9, and a differential pitch-changing mechanism 10.

Figure 3:
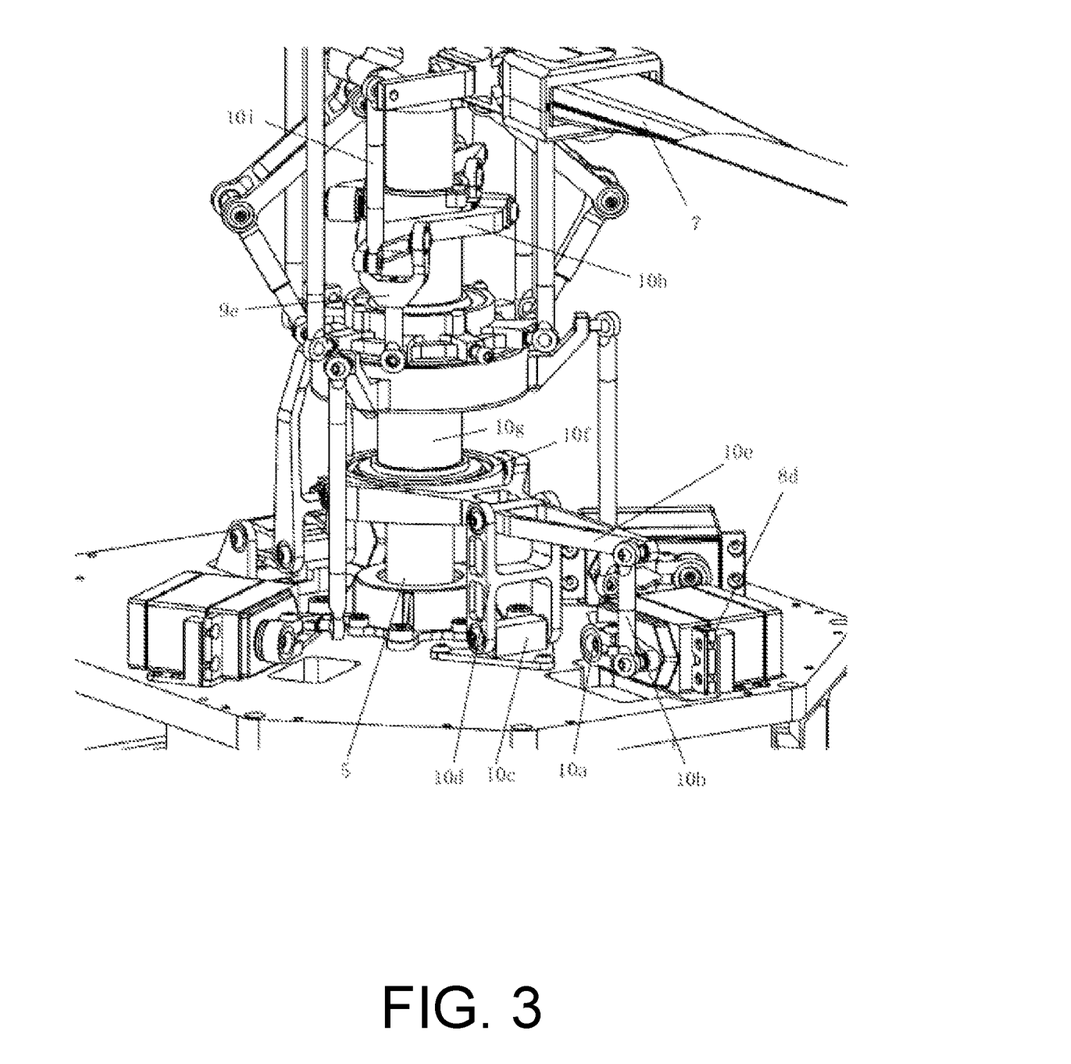
FIG. 3 is a schematic diagram of a differential pitch-changing mechanism of a coaxial helicopter.
Figure 4:
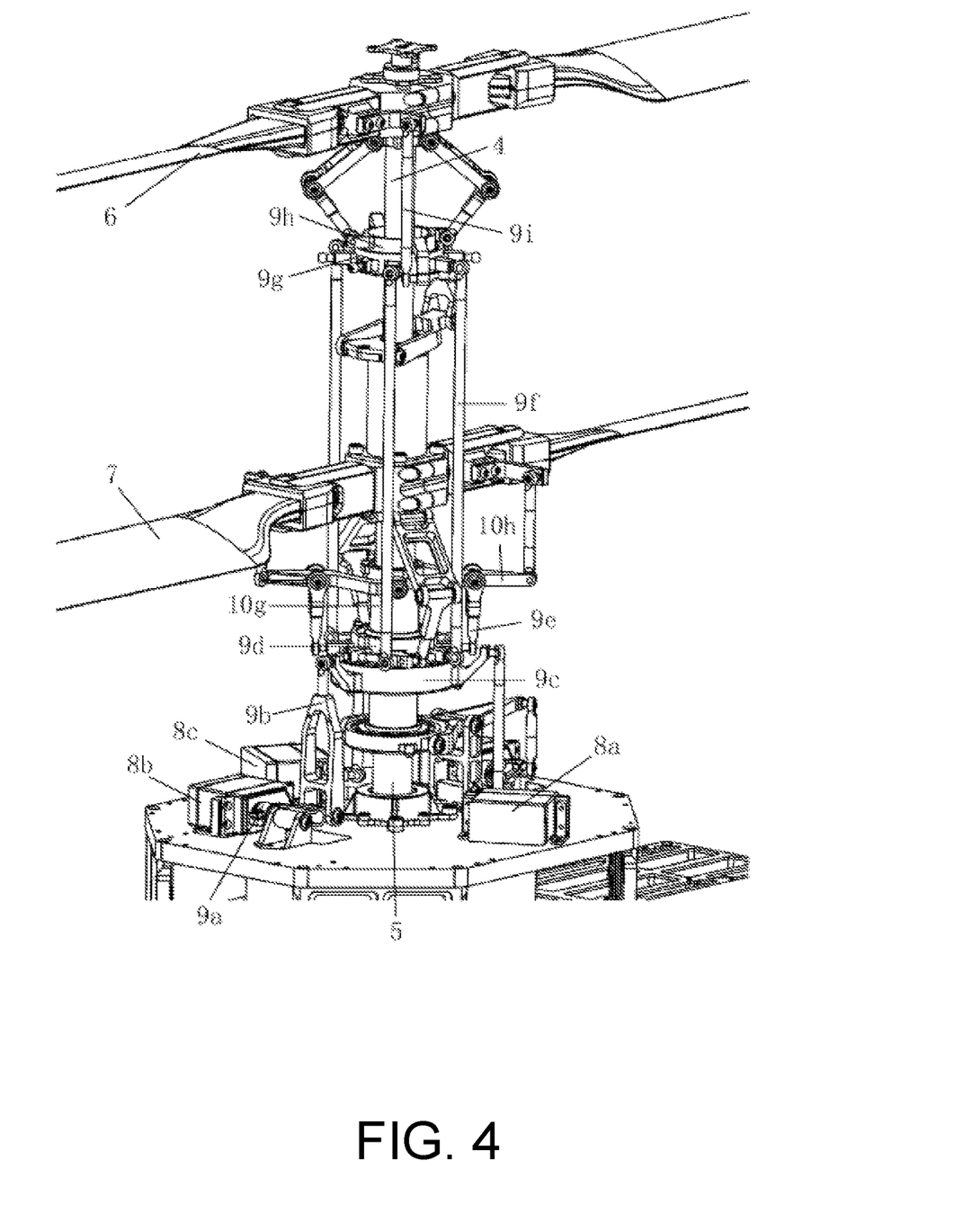
FIG. 4 is a schematic diagram of a cyclic pitch-changing mechanism of a coaxial helicopter.

The upper rotor actuator 2 and the lower rotor actuator 3 are located below the lower rotor system 7 and are fixedly connected to the fuselage 1. One end of the lower rotor drive shaft 5 is connected to an output shaft of the lower rotor actuator 3, and the other end of the lower rotor drive shaft 5 is fixedly connected to the lower rotor system 7. One end of the upper rotor drive shaft 4 is connected to an output shaft of the upper rotor actuator 2, and the other end of the upper rotor drive shaft 4 extends through the lower rotor drive shaft 5 to be fixedly connected to the upper rotor system 6. Four servomechanisms 8 are provided, and each servomechanism is fixedly connected to the fuselage 1. The cyclic pitch-changing mechanism 9 is provided with an upper swashplate 9h (as shown in FIG. 4), and the upper swashplate 9h is located between the upper rotor system 6 and the lower rotor system 7 and is slidably mounted outside the upper rotor drive shaft 4. The differential pitch-changing mechanism 10 is provided with a rotatably-supported shaft sleeve 10g (as shown in FIG. 3) which is slidably mounted outside the lower rotor drive shaft 5 and keeps synchronous rotation with the lower rotor drive shaft 5. The cyclic pitch-changing mechanism 9 is further provided with a lower swashplate 9d (as shown in FIG. 4) which is located between the lower rotor system 7 and the fuselage 1, and is slidably mounted outside the rotatably-supported shaft sleeve 10g in the differential pitch-changing mechanism 10.

Three of the four servomechanisms 8 directly drive the cyclic pitch-changing mechanism 9 through a link, and simultaneously adjust the pitches of the upper rotor system 6 and the lower rotor system 7, to make uniformity cyclic pitch-changing adjustment of the upper and lower rotors, and independent collective pitch adjustment of the upper rotor. Another of the four servomechanisms 8 drives the differential pitch-changing mechanism 10 through a link and a lever, and acts on the lower rotor system 7 together with the cyclic pitch-changing mechanisms 9 driven by the other three servomechanisms 8, to perform differential collective pitch adjustment of the lower rotor, and thus make independent collective pitch adjustment of the upper rotor system 6 and the lower rotor system 7.

FIG. 3 is a schematic diagram of a differential pitch-changing mechanism 10 of a coaxial helicopter disclosed in the present embodiment, and the differential pitch-changing mechanism 10 includes a fourth servomechanism horn 10a, a fourth servomechanism link 10b, a fixed support bracket 10c, a rotatably-supported bracket 10d, a lower lever support bracket 10e, a non-rotating sliding disc 10f, a rotatably-supported shaft sleeve 10g, an upper lever support bracket 10h, a lower swashplate drag link 9e, a lower rotor pitch-changing drag link 10i. One end of the fourth servomechanism horn 10a is fixedly connected to an output shaft of a fourth servomechanism 8d of the four servomechanisms 8, and the other end of the fourth servomechanism horn 10a is hinged to one end of the fourth servomechanism link 10b. The other end of the fourth servomechanism link 10b is hinged to one end of the lower lever support bracket 10e. The fixed support bracket 10c is fixedly connected to the fuselage 1. One end of the rotatably-supported bracket 10d is hinged to the fixed support bracket 10c, and the other end of the rotatably-supported bracket 10d is hinged to the middle part of the lower lever support bracket 10e. The other end of the lower lever support bracket 10e is hinged to the non-rotating sliding disc 10f. The non-rotating sliding disc 10f is hinged to one end of the rotatably-supported shaft sleeve 10g via a bearing and is sleeved outside the lower rotor drive shaft 5 together with the rotatably-supported shaft sleeve 10g. The other end of the rotatably-supported shaft sleeve 10g is hinged to the upper lever support bracket 10h. Two upper lever support brackets 10h are provided and are respectively hinged in central symmetry to two sides of the rotatably-supported shaft sleeve 10g, the middle part of the upper lever support bracket 10h is hinged to the lower swashplate drag link 9e, and the other end of the upper lever support bracket 10h is hinged to the lower rotor pitch-changing drag link 10i. The lower rotor pitch-changing drag link 10i is hinged to the lower rotor system 7. When the lower rotor system 7 differentially changes the pitches, the fourth servomechanism horn 10a is driven to rotate by the output shaft of the fourth servomechanism 8d to drive the fourth servomechanism link 10b to move, the fourth servomechanism link 10b pulls the lower lever support bracket 10e to rotate, the lower lever support bracket 10e drives the non-rotating sliding disc 10f to slide up and down along the lower rotor drive shaft 5, the non-rotating sliding disc 10f drives the rotatably-supported shaft sleeve 10g to slide up and down along the lower rotor drive shaft 5, and the rotatably-supported shaft sleeve 10g keeps synchronous rotation with the lower rotor drive shaft 5. The upper lever support bracket 10h drives the lower rotor pitch-changing drag link 10i to move under the combined action of the rotatably-supported shaft sleeve 10g and the lower swashplate drag link 9e, and the lower rotor pitch-changing drag link 10i drives the lower rotor system 7 to perform lower rotor differential pitch-changing operation.

FIG. 4 is a schematic diagram of a cyclic pitch-changing mechanism 9 of a coaxial helicopter disclosed in the present embodiment, the cyclic pitch-changing mechanism 9 mainly includes a servomechanism horn 9a, a servomechanism link 9b, a non-rotating swashplate 9c, a non-rotating swashplate 9d, a lower swashplate drag link 9e, a rotatably-supported shaft sleeve 10g, an upper lever support bracket 10h, a swashplate tie rod 9f, a transitional swashplate 9g, an upper swashplate 9h, and an upper swashplate 9i. Three servomechanism horns 9a are provided, and one end of each servomechanism horn 9a is fixedly connected to the output shaft of the first three servomechanisms (8a, 8b and 8c) respectively. Three servomechanism links 9b are further provided, one end of each servomechanism link 9b is hinged to the other end of three servomechanism horns 9a respectively, and the other end of each servomechanism link 9b is hinged to the non-rotating swashplate 9c respectively. The non-rotating swashplate 9c is hinged to the non-rotating swashplate 9d via a bearing. The non-rotating swashplate 9d is hinged to one end of the lower swashplate drag link 9e. The other end of the lower swashplate drag link 9e is hinged to the middle part of the upper lever support bracket 10h. One end of the swashplate tie rod 9f is hinged to the non-rotating swashplate 9d, the other end of the swashplate tie rod 9f is hinged to the transitional swashplate 9g. The transitional swashplate 9g is hinged to the upper swashplate 9h via a bearing. The upper swashplate 9h is hinged to the upper swashplate 9i. The upper swashplate 9i is hinged to the upper rotor system 6. When the upper rotor system 7 and the lower rotor system 7 change pitches cyclically, the servomechanism horn 9a is rotated under the action of the output shaft of the servomechanism, so that the servomechanism link 9b is driven to move, the servomechanism link 9b pulls the non-rotating swashplate 9c to tilt or move up and down, the non-rotating swashplate 9c drives the non-rotating swashplate 9d to tilt or move up and down, the non-rotating swashplate 9d drives the lower swashplate drag link 9e to move, the upper lever support bracket 10h drives the lower rotor pitch link 10i to move under the joint action of the lower swashplate drag link 9e and the rotatably-supported shaft sleeve 10g, and the lower rotor pitch link 10i drives the lower rotor system 7 to perform pitch-changing operation. At that moment, the non-rotating swashplate 9d drives the swashplate tie rod 9f to move, the swashplate tie rod 9f drives the transitional swashplate 9g to tilt or move up and down, the transitional swashplate 9g drives the upper swashplate 9h to tilt or move up and down, the upper swashplate 9h drives the upper swashplate 9i to move, and the upper swashplate 9i drives the upper rotor system 6 to perform pitch-changing operation.

Figure 5:
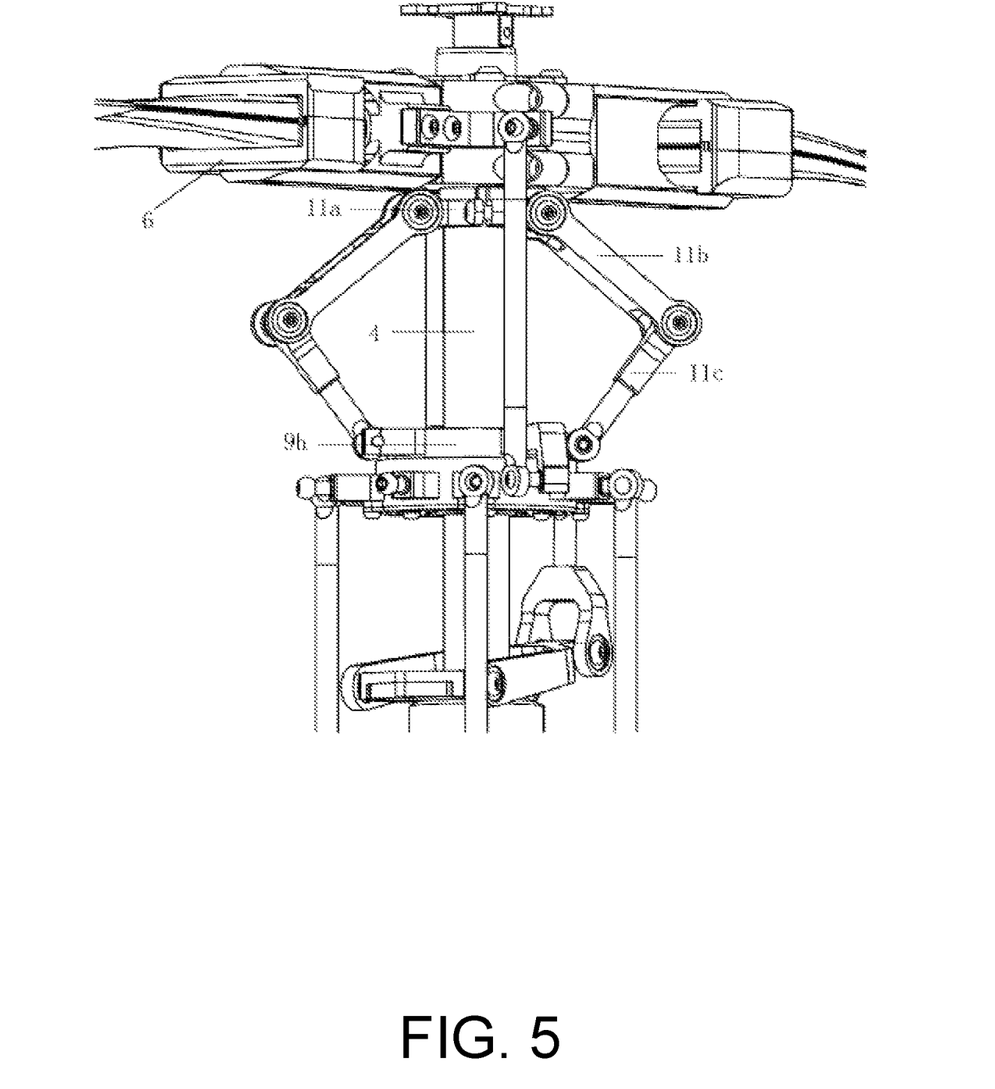
FIG. 5 is a schematic diagram of an upper synchronous rotating mechanism of a coaxial helicopter.

FIG. 5 is a schematic diagram of an upper synchronous rotating mechanism 11 of a coaxial helicopter disclosed in the present embodiment, and the coaxial helicopter mainly includes an upper drive shaft sleeve 11a, an upper synchronous tie rod 11b, and an upper synchronous link 11c. The upper drive shaft sleeve 11a is fixedly connected to the upper rotor drive shaft 4. Two upper synchronous tie rods 11b and two upper synchronous links 11c are provided. The two upper synchronous tie rods 11b are respectively hinged in symmetry to two sides of the upper drive shaft sleeve 11a, and the other end of each upper synchronous tie rod 11b is hinged to one end of the upper synchronous link 11c. The other end of the upper synchronous link 11c is hinged to the upper swashplate 9h. The upper synchronous rotating mechanism 11 drives the upper swashplate 9h to synchronously rotate along with the upper rotor drive shaft 4 during operation.

Figure 6:
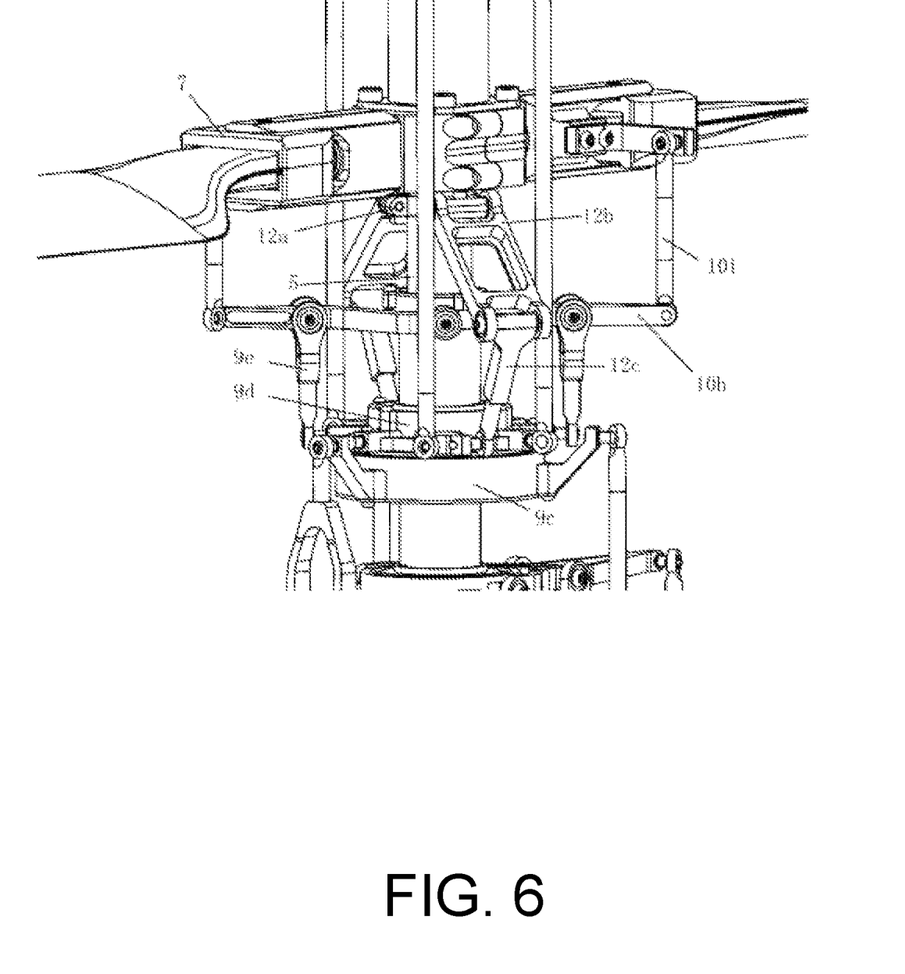
FIG. 6 is a schematic diagram of a lower upper synchronous rotating mechanism of a coaxial helicopter.

FIG. 6 is a schematic diagram of a lower synchronous rotating mechanism 12 of a coaxial helicopter disclosed in the present embodiment, and the coaxial helicopter mainly includes a lower drive shaft sleeve 12a, a lower synchronous tie rod 12b, and a lower synchronous link 12c. The lower drive shaft sleeve 12a is fixedly connected to the lower rotor drive shaft 5. Two lower synchronous tie rods 12b and two lower synchronous links 12c are provided. The two lower synchronous tie rods 12b are respectively hinged in symmetry to two sides of the lower drive shaft sleeve 12a, and the other end of each lower synchronous tie rod 12b is hinged to one end of the lower synchronous link 12c. The other end of the lower synchronous link 12c is hinged to the lower swashplate 9d. The lower synchronous rotating mechanism 12 drives the lower swashplate 9d to synchronously rotate along with the lower rotor drive shaft 5 during operation.

Figure 7:
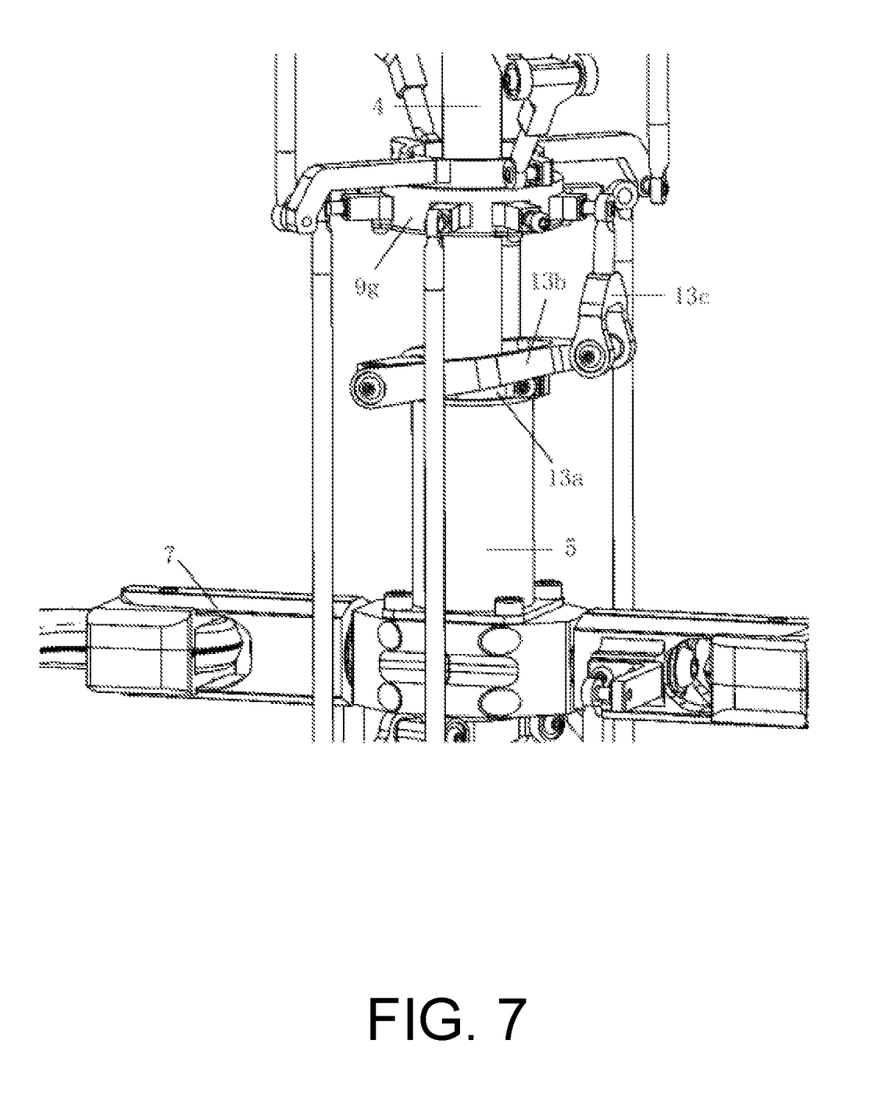
FIG. 7 is a schematic diagram of a middle synchronous rotating of a coaxial helicopter.

FIG. 7 is a schematic diagram of a middle synchronous rotating mechanism 13 of a coaxial helicopter disclosed in the present embodiment, and the coaxial helicopter mainly includes a middle drive shaft sleeve 13a, a middle synchronous tie rod 13b, and a middle synchronous link 13c. The middle drive shaft sleeve 13a is fixedly connected to the lower rotor system 7 or the lower rotor drive shaft 5. One end of the middle synchronous tie rod 13b is hinged to the middle drive shaft sleeve 13a, and the other end of the middle synchronous tie rod 13b is hinged to one end of the middle synchronous link 13c. The other end of the middle synchronous link 13c is hinged to the transitional swashplate 9g. The middle synchronous rotating mechanism 13 drives the transitional swashplate 19g to synchronously rotate along with the lower rotor drive shaft 5 during operation.

Figure 8:
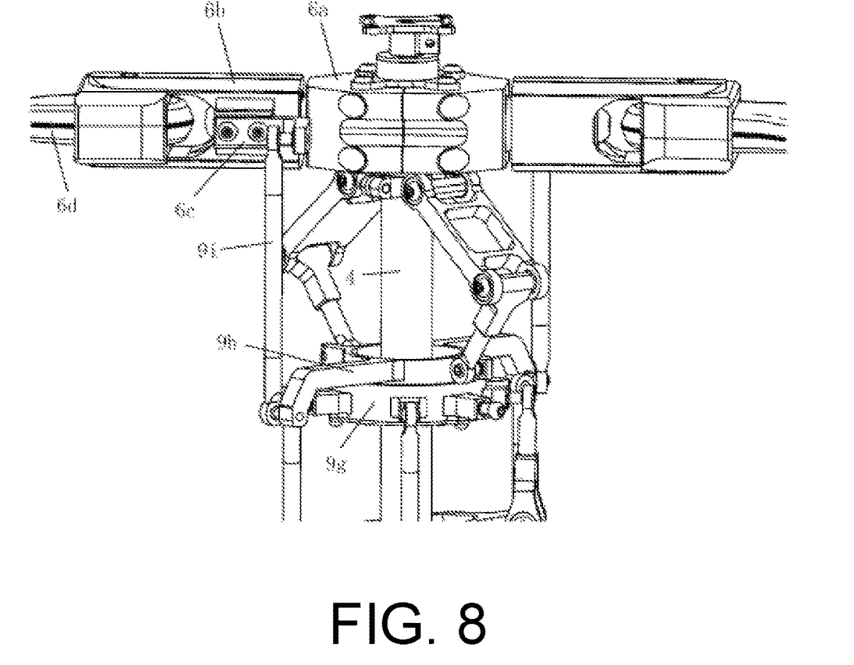
FIG. 8 is a schematic diagram of an upper rotor system of a coaxial helicopter.

FIG. 8 is a schematic diagram of an upper rotor system 6 of a coaxial helicopter disclosed in the present embodiment, and the coaxial helicopter mainly includes an upper hub 6a, an upper hub sleeve 6b, an upper tie rod connector 6c and an upper rotor 6d. A center of the upper hub 6a is fixedly connected to an upper end of the upper rotor drive shaft 4. One end of the upper hub sleeve 6b is hinged to an end portion of the upper hub 6a, the other end of the upper hub sleeve 6b is hinged to a root portion of the upper rotor 6d. The upper tie rod connector 6c is fixedly mounted on a side of the upper hub sleeve 6b, and is hinged to the upper rotor pitch drag link 9i.

Figure 9:
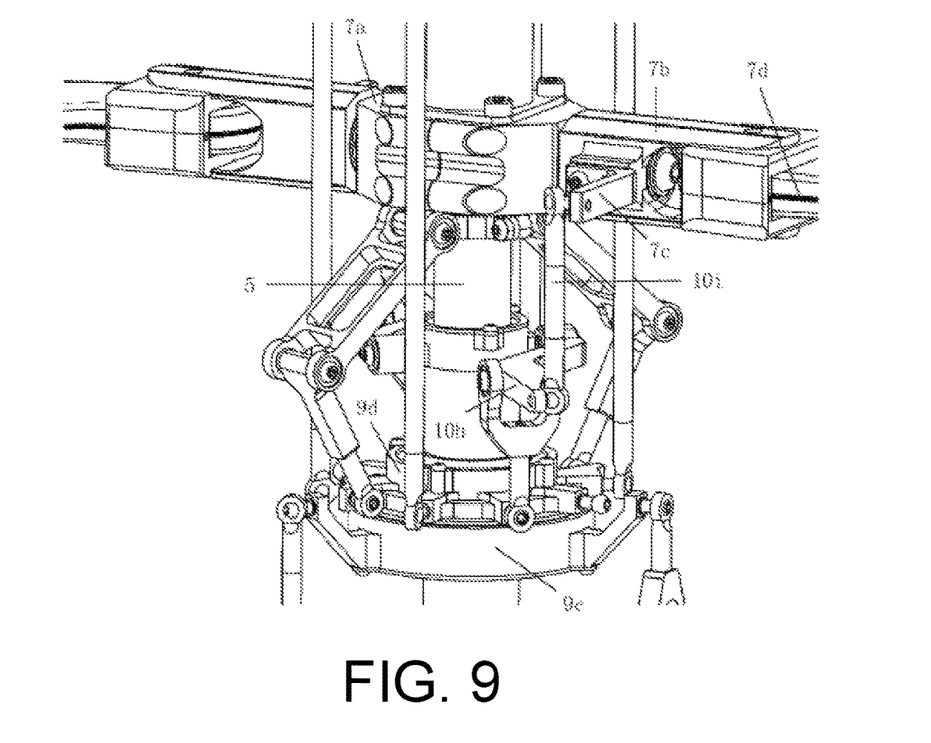
FIG. 9 is a schematic diagram of a lower rotor system of a coaxial helicopter.

FIG. 9 is a schematic diagram of a lower rotor system 7 of a coaxial helicopter disclosed in the present embodiment, and the coaxial helicopter mainly includes a lower hub 7a, a lower hub sleeve 7b, a lower tie rod connector 7c and a lower rotor 7d. A center of the lower hub 7a is fixedly connected to an upper end of the lower rotor drive shaft 5. One end of the lower hub sleeve 7b is hinged to an end portion of the lower hub 7a, the other end of the lower hub sleeve 7b is hinged to a root portion of the lower rotor 7d. The lower tie rod connector 7c is fixedly mounted on a side of the lower hub sleeve 7b, and is hinged to the lower rotor pitch drag link 10i.

In this embodiment, the upper rotor drive shaft 4 is a hollow tubular shaft.

In this embodiment, at least three swashplate tie rods 9f are provided, and the center of gravity for each the swashplate tie rod 9f is located on the axis of the rotor drive shaft 4 or 5.

In this embodiment, a hinged connection between respective members is directly hinged or hinged via a bearing.

In this embodiment, the upper rotor actuator 2 and the lower rotor actuator 3 are selected from any one of a direct-drive or deceleration actuator, an electrically or hydraulically actuated actuator, a dual-power or single-power actuator.

In this embodiment, the servomechanism outputs a torsional force, a pushing force or a pulling force.

In this embodiment, the single-layer rotor of the upper system 6 and the lower rotor system 7 can be a two-blade rotor or a multi-blade rotor; the rotor 6d or 7d can be non-folded, laterally folded or longitudinally folded.

In this embodiment, the servomechanism 8 can output a torsional force, a pushing force or a pulling force.

In this embodiment, the coaxial helicopter can be equipped with a forward propulsion power system at an appropriate position on the fuselage 1, to form a high-speed helicopter.

In this embodiment, there is provided a method of controlling a coaxial helicopter, which includes the steps.

A cyclic pitch-changing mechanism 9 adjusts a synchronous tilting angle of an upper swashplate 9h and a lower swashplate 9d, controls a direction of a synchronous cyclic pitch-changing force of an upper system 6 and a lower rotor system 7, so that pitching and rolling motions of the helicopter are performed.

The cyclic pitch-changing mechanism 9 adjusts independently a collective pitch of an upper rotor system 6, the cyclic pitch-changing mechanism 9 and a differential pitch-changing mechanism 10 adjusts independently a collective pitch of the lower rotor system 7 in the same direction as the upper rotor system 6, so that collective pitches of the upper rotor system 6 and the lower system 7 are increased or decreased synchronously, and lifting motion of the helicopter are performed.

The cyclic pitch-changing mechanism 9 adjusts independently the collective pitch of the upper rotor system 6, and, the cyclic pitch-changing mechanism 9 and the differential pitch-changing mechanism 10 adjusts independently a collective pitch of the lower rotor system 7 in the opposite direction as the upper rotor system 6, so that collective pitches of the upper rotor system 6 and the lower system 7 are adjusted differentially, and yawing motion of the helicopter are performed.

Embodiment 2

Figure 10:
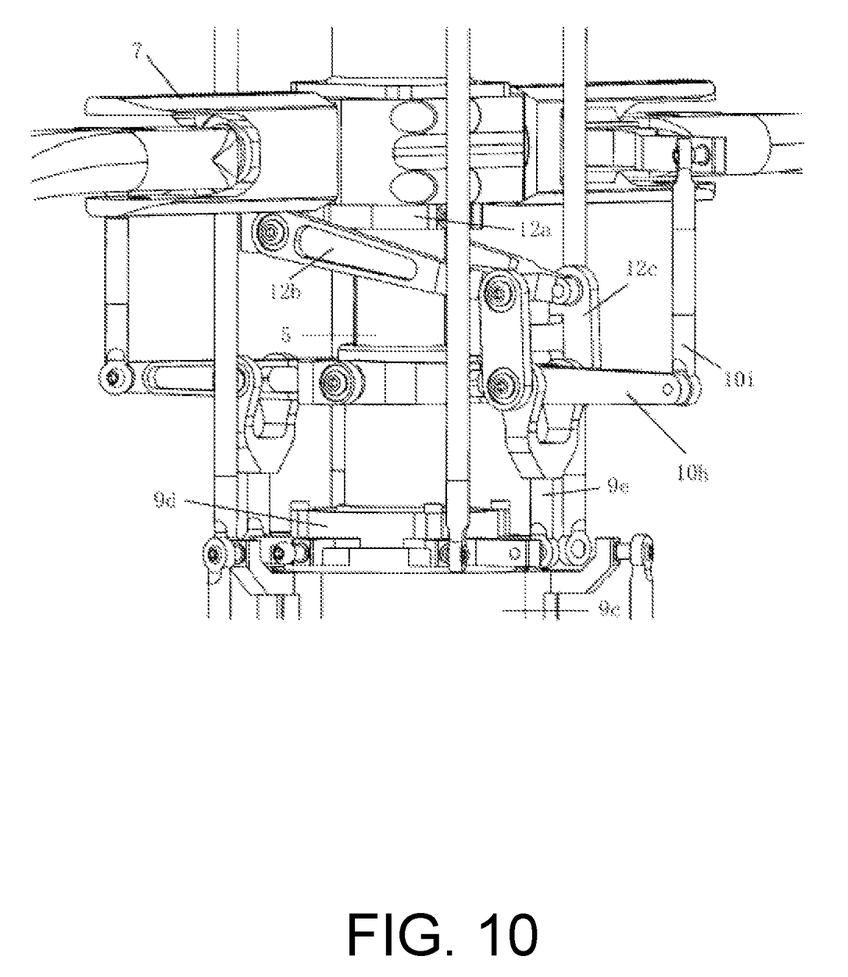
FIG. 10 is a schematic diagram of another lower synchronous rotating mechanism of a coaxial helicopter.

Embodiment 2 differs from Embodiment 1 in that: as shown in FIG. 10, in the lower synchronous rotating mechanism 12, one end of the lower synchronous link 12c is hinged to the lower synchronous tie rod 12b, and the other end of the lower synchronous link 12c is hinged to the lower swashplate drag link 9e at a hinged position in the middle part of the lower swashplate drag link 9e and the upper lever support bracket 10h.

The technical means disclosed in the present application are not limited to the technical means disclosed by the above technical means, and also include the technical solutions of any combination of the above technical features. Although certain specific embodiments are described above for instructional purposes, it will be apparent to those skilled in the art that various modifications and variations can be made without departing from the principles of the present application. These modifications and variations are also considered to be within the scope of the present application.

What is claimed is:

1. A coaxial helicopter comprising a fuselage, an upper rotor actuator, a lower rotor actuator, an upper rotor drive shaft, a lower rotor drive shaft, an upper rotor system, a lower rotor system, and four servomechanisms, further comprising: a cyclic pitch-changing mechanism and a differential pitch-changing mechanism; wherein the upper rotor actuator and the lower rotor actuator are located below the lower rotor system and are fixedly connected to the fuselage; one end of the lower rotor drive shaft is connected to an output shaft of the lower rotor actuator, and the other end of the lower rotor drive shaft is fixedly connected to the lower rotor system; one end of the upper rotor drive shaft is connected to an output shaft of the upper rotor actuator, and the other end of the upper rotor drive shaft extends through the lower rotor drive shaft to be fixedly connected to the upper rotor system; each of the servomechanisms is fixedly connected to the fuselage; the cyclic pitch-changing mechanism is provided with an upper swashplate, and the upper swashplate is located between the upper rotor system and the lower rotor system and is slidably mounted outside the upper rotor drive shaft; the differential pitch-changing mechanism is provided with a rotatably-supported shaft sleeve which is slidably mounted outside the lower rotor drive shaft and keeps synchronous rotation with the lower rotor drive shaft; the cyclic pitch-changing mechanism is further provided with a lower swashplate which is located between the lower rotor system and the fuselage, and is slidably mounted outside the rotatably-supported shaft sleeve in the differential pitch-changing mechanism;

three of the four servomechanisms directly drive the cyclic pitch-changing mechanism through a link, and simultaneously adjust pitches of the upper rotor system and the lower rotor system, to make uniformity cyclic pitch-changing adjustment of upper and lower rotors, and independent collective pitch adjustment of the upper rotor; another one of the four servomechanisms drives the differential pitch-changing mechanism through a link and a lever, and acts on the lower rotor system together with the cyclic pitch-changing mechanisms driven by the three servomechanisms, to perform differential collective pitch adjustment of the lower rotor, so as to make independent collective pitch adjustment of the upper rotor system and the lower rotor system.

2. The coaxial helicopter according to claim 1, wherein the differential pitch-changing mechanism comprises a servomechanism horn, a servomechanism link, a fixed support bracket, a rotatably-supported bracket, a lower lever support bracket, a non-rotating sliding disc, a rotatably-supported shaft sleeve, an upper lever support bracket, a lower swashplate drag link, and a lower rotor pitch-changing drag link; one end of the servomechanism horn is fixedly connected to an output shaft of the one servomechanism of the four servomechanisms, and the other end of the servomechanism horn is hinged to one end of the servomechanism link; the other end of the servomechanism link is hinged to one end of the lower lever support bracket; the fixed support bracket is fixedly connected to the fuselage; one end of the rotatably-supported bracket is hinged to the fixed support bracket, and the other end of the rotatably-supported bracket is hinged to a middle part of the lower lever support bracket; the other end of the lower lever support bracket is hinged to the non-rotating sliding disc; the non-rotating sliding disc is hinged to one end of the rotatably-supported shaft sleeve via a bearing and is sleeved outside the lower rotor drive shaft together with the rotatably-supported shaft sleeve; the other end of the rotatably-supported shaft sleeve is hinged to the upper lever support bracket; a middle part of the upper lever support bracket is hinged to the lower swashplate drag link, and the other end of the upper lever support bracket is hinged to the lower rotor pitch-changing drag link; the lower rotor pitch-changing drag link is hinged to the lower rotor system; when the lower rotor system differentially changes the pitches, the servomechanism horn is driven to rotate by the output shaft of the servomechanism to drive the servomechanism link to move, the servomechanism link pulls the lower lever support bracket to rotate, the lower lever support bracket drives the non-rotating sliding disc to slide up and down along the lower rotor drive shaft, the non-rotating sliding disc drives the rotatably-supported shaft sleeve to slide up and down along the lower rotor drive shaft, and the rotatably-supported shaft sleeve keeps synchronous rotation with the lower rotor drive shaft; the upper lever support bracket drives the lower rotor pitch-changing drag link to move under a combined action of the rotatably-supported shaft sleeve and the lower swashplate drag link, and the lower rotor pitch-changing drag link drives the lower rotor system to perform lower rotor differential pitch-changing operation.

3. The coaxial helicopter according to claim 2, wherein the cyclic pitch-changing mechanism comprises another three servomechanism horns, another three servomechanism links, a non-rotating swashplate, a lower swashplate, a lower swashplate drag link, a rotatably-supported shaft sleeve, an upper lever support bracket, at least one swashplate tie rod, a transitional swashplate, an upper swashplate, and an upper rotor pitch drag link; one end of each of the three servomechanism horns is fixedly connected to an output shaft of one of the servomechanisms respectively; one end of each of the three servomechanism links is hinged to the other end of three servomechanism horns respectively, and the other end of each of the servomechanism links is hinged to the non-rotating swashplate respectively; the non-rotating swashplate is hinged to the lower swashplate via a bearing; the lower swashplate is hinged to one end of the lower swashplate drag link; the other end of the lower swashplate drag link is hinged to the middle part of the upper lever support bracket; one end of the at least one swashplate tie rod is hinged to the lower swashplate, the other end of the at least one swashplate tie rod is hinged to the transitional swashplate; the transitional swashplate is hinged to the upper swashplate via a bearing; the upper swashplate is hinged to the upper rotor pitch drag link; the upper rotor pitch drag link is hinged to the upper rotor system; when the upper rotor system and the lower rotor system change pitches cyclically, each of the servomechanism horns is rotated under an action of the output shaft of the corresponding servomechanism, so that the corresponding servomechanism link is driven to move, the servomechanism link pulls the non-rotating swashplate to tilt or move up and down, the non-rotating swashplate drives the lower swashplate to tilt or move up and down, the lower swashplate drives the lower swashplate drag link to move, the upper lever support bracket drives the lower rotor pitch link to move under a joint action of the lower swashplate drag link and the rotatably-supported shaft sleeve, and the lower rotor pitch link drives the lower rotor system to perform pitch-changing operation; at that moment, the lower swashplate drives the at least one swashplate tie rod to move, the at least one swashplate tie rod drives the transitional swashplate to tilt or move up and down, the transitional swashplate drives the upper swashplate to tilt or move up and down, the upper swashplate drives the upper rotor pitch drag link to move, and the upper rotor pitch drag link drives the upper rotor system to perform pitch-changing operation.

4. The coaxial helicopter according to claim 3, further comprising an upper synchronous rotating mechanism, wherein the upper synchronous rotating mechanism comprises an upper drive shaft sleeve, an upper synchronous tie rod, and an upper synchronous link; the upper drive shaft sleeve is fixedly connected to the upper rotor drive shaft; one end of the upper synchronous tie rod is hinged to the upper drive shaft sleeve, and the other end of the upper synchronous tie rod is hinged to one end of the upper synchronous link; the other end of the upper synchronous link is hinged to the upper swashplate; the upper synchronous rotating mechanism drives the upper swashplate to synchronously rotate along with the upper rotor drive shaft during operation.

5. The coaxial helicopter according to claim 3, further comprising a lower synchronous rotating mechanism, wherein the lower synchronous rotating mechanism comprises a lower drive shaft sleeve, a lower synchronous tie rod, and a lower synchronous link; the lower drive shaft sleeve is fixedly connected to the lower rotor drive shaft; one end of the lower synchronous tie rod is hinged to the lower drive shaft sleeve, and the other end of the lower synchronous tie rod is hinged to one end of the lower synchronous link; the other end of the lower synchronous link is directly hinged to the lower swashplate; the lower synchronous rotating mechanism drives the lower swashplate to synchronously rotate along with the lower rotor drive shaft during operation.

6. The coaxial helicopter according to claim 3, further comprising a middle synchronous rotating mechanism, wherein the middle synchronous rotating mechanism comprises a middle drive shaft sleeve, a middle synchronous tie rod, and a middle synchronous link; the middle drive shaft sleeve is fixedly connected to the lower rotor system or the lower rotor drive shaft; one end of the middle synchronous tie rod is hinged to the middle drive shaft sleeve, and the other end of the middle synchronous tie rod is hinged to one end of the middle synchronous link; the other end of the middle synchronous link is hinged to the transitional swashplate; the middle synchronous rotating mechanism drives the transitional swashplate to synchronously rotate along with the lower rotor drive shaft during operation.

7. The coaxial helicopter according to claim 1, wherein the upper rotor system comprises an upper hub, an upper hub sleeve, an upper tie rod connector and the upper rotor; a center of the upper hub is fixedly connected to an upper end of the upper rotor drive shaft; one end of the upper hub sleeve is hinged to an end portion of the upper hub, the other end of the upper hub sleeve is hinged to a root portion of the upper rotor; the upper tie rod connector is fixedly mounted on a side of the upper hub sleeve, and is hinged to the upper rotor pitch drag link.

8. The coaxial helicopter according to claim 1, wherein the lower rotor system comprises a lower hub, a lower hub sleeve, a lower tie rod connector and the lower rotor; a center of the lower hub is fixedly connected to an upper end of the lower rotor drive shaft; one end of the lower hub sleeve is hinged to an end portion of the lower hub, the other end of the lower hub sleeve is hinged to a root portion of the lower rotor; the lower tie rod connector is fixedly mounted on a side of the lower hub sleeve, and is hinged to the lower rotor pitch drag link.

9. The coaxial helicopter according to claim 1, wherein the upper rotor drive shaft is a hollow tubular shaft.

10. The coaxial helicopter according to claim 3, wherein the at least one swashplate tie rod comprises at least three swashplate tie rods, and a center of gravity for each of the swashplate tie rods is located on an axis of the rotor drive shaft.

11. The coaxial helicopter according to claim 3, wherein a hinged connection between respective members is directly hinged or hinged via a bearing.

12. The coaxial helicopter according to claim 1, wherein each of the upper rotor actuator and the lower rotor actuator is selected from one of a direct-drive actuator, a deceleration actuator, an electrically actuated actuator, a hydraulically actuated actuator, a dual-power actuator and a single-power actuator.

13. The coaxial helicopter according to claim 1, wherein a single-layer rotor of the upper rotor system and the lower rotor system is a two-blade rotor or a multi-blade rotor; the rotor is non-folded, laterally folded or longitudinally folded.

14. The coaxial helicopter according to claim 1, wherein each of the servomechanisms outputs a torsional force, a pushing force or a pulling force.

15. The coaxial helicopter according to claim 1, wherein the coaxial helicopter is equipped with a forward propulsion power system at an appropriate position on the fuselage, to form a high-speed helicopter.

16. A method of controlling coaxial helicopter, comprising steps of:
  adjusting, by a cyclic pitch-changing mechanism, a synchronous tilting angle of an upper swashplate and a lower swashplate, controlling a direction of a synchronous cyclic pitch-changing force of an upper rotor system and a lower rotor system, so that pitching and rolling motions of a helicopter are performed;
  adjusting independently a collective pitch of the upper rotor system, by the cyclic pitch-changing mechanism, and adjusting independently a collective pitch of the lower rotor system in the same direction as the upper rotor system, by the cyclic pitch-changing mechanism and a differential pitch-changing mechanism, so that collective pitches of the upper rotor system and the lower rotor system are increased or decreased synchronously, and lifting motion of the helicopter are performed; and
  adjusting independently the collective pitch of the upper rotor system, by the cyclic pitch-changing mechanism, and adjusting independently a collective pitch of the lower rotor system in an opposite direction as the upper rotor system, by the cyclic pitch-changing mechanism and the differential pitch-changing mechanism, so that the collective pitches of the upper rotor system and the lower rotor system are adjusted differentially, and yawing motion of the helicopter are performed.

* * * * *